United States Patent
Windell et al.

(10) Patent No.: US 8,589,741 B2
(45) Date of Patent: *Nov. 19, 2013

(54) SERVER NETWORK DIAGNOSTIC SYSTEM

(75) Inventors: David Windell, Raleigh, NC (US);
Pravin Patel, Cary, NC (US); James Hughes, Apex, NC (US); Christopher West, Raleigh, NC (US); Robert Piper, Apex, NC (US); Timothy Schlude, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/458,319

(22) Filed: Apr. 27, 2012

(65) Prior Publication Data
US 2012/0216083 A1    Aug. 23, 2012

Related U.S. Application Data

(63) Continuation of application No. 12/560,088, filed on Sep. 15, 2009.

(51) Int. Cl.
*G06F 11/00* (2006.01)
(52) U.S. Cl.
USPC .............................. 714/46; 709/223; 709/224
(58) Field of Classification Search
USPC ........................................................... 714/46
See application file for complete search history.

(56) References Cited

U.S. PATENT DOCUMENTS

| | | | |
|---|---|---|---|
| 4,606,024 A | | 8/1986 | Glass et al. |
| 5,239,547 A | * | 8/1993 | Tomiyama et al. ............. 714/26 |
| 5,369,756 A | * | 11/1994 | Imura et al. ...................... 714/26 |
| 6,061,742 A | * | 5/2000 | Stewart et al. ................. 709/250 |
| 6,601,159 B1 | * | 7/2003 | Smith et al. ...................... 712/29 |
| 6,701,462 B1 | * | 3/2004 | Majcher et al. ................. 714/43 |
| 6,715,103 B1 | * | 3/2004 | Nagai .............................. 714/25 |
| 6,789,206 B1 | * | 9/2004 | Wierzbicki et al. ........... 713/300 |
| 6,892,317 B1 | * | 5/2005 | Sampath et al. ............... 714/4.3 |
| 6,895,532 B2 | * | 5/2005 | Raynham ........................ 714/46 |
| 7,000,147 B2 | | 2/2006 | Hsu |
| 7,113,196 B2 | * | 9/2006 | Kerr ................................. 345/83 |

(Continued)

FOREIGN PATENT DOCUMENTS

| | | |
|---|---|---|
| JP | 411073261 A | 3/1999 |
| JP | 2004083273 A | 3/2004 |
| KR | 2006075174 | 7/2006 |

OTHER PUBLICATIONS

IPCOM000158212D "Controllling Auxiliary Blade Chassis Display", Sep. 19, 2007, 3 pages, IP.com, Inc., http://www.priorartdatabase.com/IPCOM/000158212.

*Primary Examiner* — Kamini Patel
(74) *Attorney, Agent, or Firm* — Suiter Swantz pc llo

(57) ABSTRACT

Methods and systems for implementing such methods for providing server fault notifications, diagnostic and system management information may include, but are not limited to: receiving a network fault status request input; illuminating one or more server node fault indicators for one or more degraded server nodes having one or more faults; receiving a server node fault status request input for a degraded server node having one or more faults; and displaying one or more diagnostic service notifications for one or more faults of the degraded server node.

The displaying of the diagnostic service notifications may allow for the completion of various service operations associated with the service notifications once the information specific to a fault is presented.

23 Claims, 13 Drawing Sheets

(56) References Cited

U.S. PATENT DOCUMENTS

| | | | |
|---|---|---|---|
| 7,149,936 B2* | 12/2006 | Deshpande et al. | 714/57 |
| 7,343,524 B2* | 3/2008 | Klotz et al. | 714/39 |
| 7,523,349 B2* | 4/2009 | Barras | 714/25 |
| 7,873,795 B2* | 1/2011 | Brabant et al. | 711/145 |
| 7,949,905 B2* | 5/2011 | Sharma et al. | 714/49 |
| 2002/0087677 A1* | 7/2002 | Maeda et al. | 709/223 |
| 2002/0120699 A1 | 8/2002 | Wakabayashi | |
| 2003/0090965 A1 | 5/2003 | Handa et al. | |
| 2003/0164771 A1* | 9/2003 | Dove et al. | 340/679 |
| 2003/0167345 A1* | 9/2003 | Knight et al. | 709/249 |
| 2004/0181367 A1 | 9/2004 | Nguyen et al. | |
| 2005/0076102 A1 | 4/2005 | Chen et al. | |
| 2005/0117147 A1 | 6/2005 | Beller et al. | |
| 2006/0248407 A1* | 11/2006 | Adams et al. | 714/43 |
| 2007/0061663 A1* | 3/2007 | Loyd et al. | 714/746 |
| 2007/0067678 A1* | 3/2007 | Hosek et al. | 714/25 |
| 2008/0030362 A1* | 2/2008 | Huang et al. | 340/815.45 |
| 2009/0034411 A1* | 2/2009 | Bernard | 370/221 |
| 2009/0302782 A1* | 12/2009 | Smith | 315/297 |
| 2010/0199132 A1* | 8/2010 | Compton et al. | 714/57 |
| 2010/0241907 A1* | 9/2010 | Nakamura et al. | 714/43 |
| 2011/0047260 A1* | 2/2011 | Jiang et al. | 709/223 |
| 2011/0219271 A1* | 9/2011 | Kaneko et al. | 714/47.1 |
| 2012/0036250 A1* | 2/2012 | Vaswani et al. | 709/224 |

\* cited by examiner

SERVER NETWORK DIAGNOSTIC SYSTEM

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications, including any priority claims, is incorporated herein by reference to the extent such subject matter is not inconsistent herewith.

RELATED APPLICATIONS

The present application constitutes a continuation of the United States Patent Application filed under U.S. patent application Ser. No. 12/560,088, entitled SERVER NETWORK DIAGNOSTIC SYSTEM, naming David Windell, Pravin Patel, James Hughes, Christopher West, Robert Piper, and Timothy Schlude, as inventors, filed Sep. 15, 2009, which is currently co-pending or is an application of which a currently co-pending application is entitled to the benefit of the filing date.

BACKGROUND

Server environments may maintain diagnostic systems which may provide information regarding a system faults associated with faulty hardware. Such systems may be utilized by service providers to diagnose system faults and quickly employ corrective measures.

SUMMARY

Methods and systems for providing server fault notifications are provided.

A method for providing server fault notifications may include, but is not limited to: receiving a network fault status request input; illuminating one or more server node fault indicators for one or more degraded server nodes having one or more faults; receiving a server node fault status request input for a degraded server node having one or more faults; and displaying one or more diagnostic service notifications for one or more faults of the degraded server node.

A system for providing server fault notifications may include, but is not limited to: a fault notification management device including a fault notification management interface; a network fault status indicator; and one or more server nodes, a server node of the one or more server nodes including: a server node fault status indicator, a server node fault controller configured to broadcast one or more server node fault notifications to the fault notification management device.

The displaying of the diagnostic service notifications may allow users to complete various service operations associated with the service notifications once the information specific to a fault is presented and understood by the user. Such actions may include placing a system in standby mode, transferring workloads to other systems, initiating a firmware update, placing the system in a mode that allows for physical maintenance, or ordering parts associated with one or more faults

DETAILED DESCRIPTION

Figure 1:
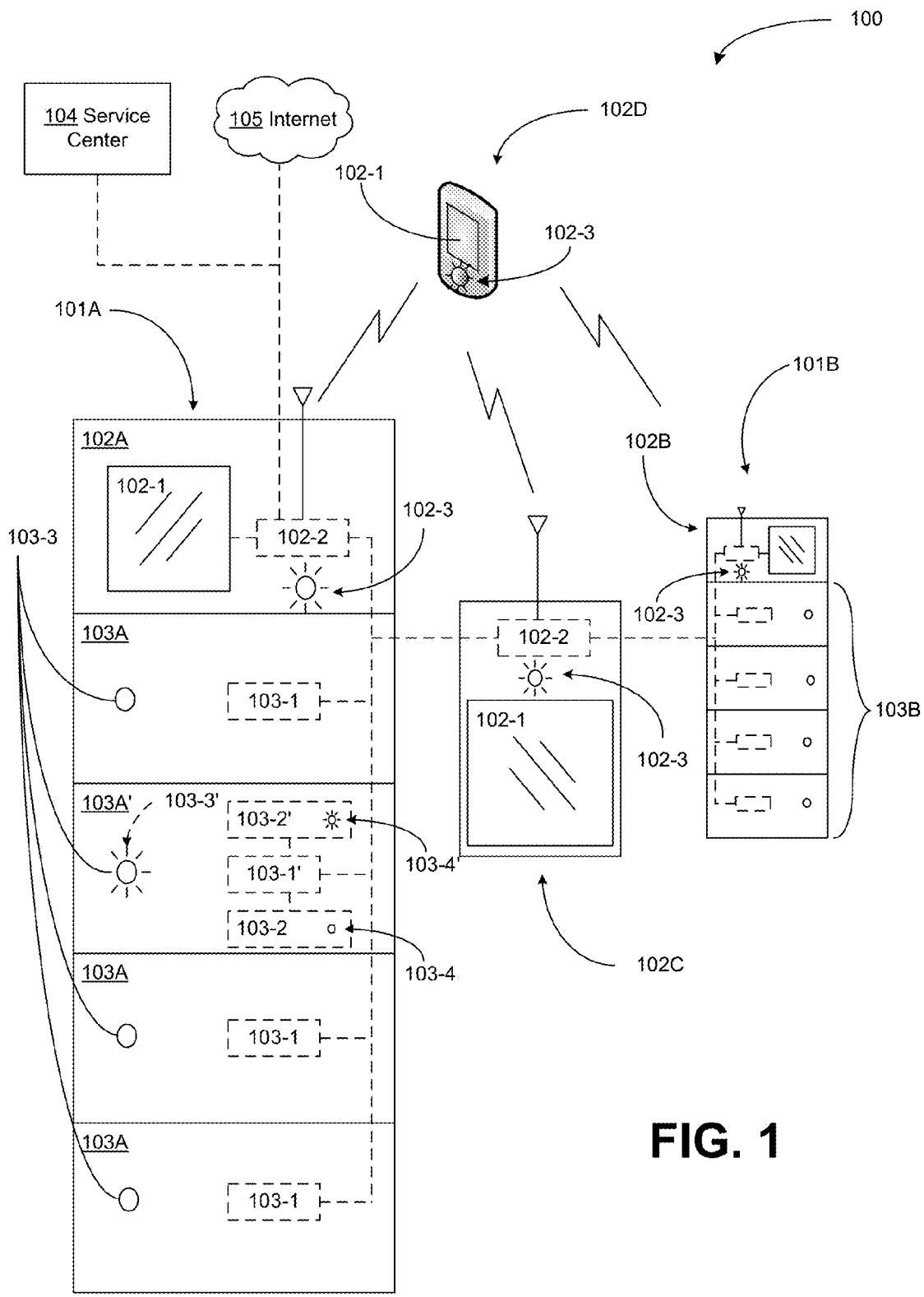
FIG. 1 shows a high-level block diagram of a system for providing server fault notifications.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 illustrates an example environment in which one or more technologies may be implemented. A server fault notification system 100 may provide functionality which facilitates the diagnosis and servicing of system faults within multiple-server systems. The server fault notification system 100 may employ a "touch-of-a-button" mechanism for fault diagnosis and notification. A user (e.g. a system administrator, service professional, and the like) may press a single button associated with the server fault notification system 100 and be presented with service and support information (e.g. detailed error information, service contact information, replacement component part numbers, servicing instructions, online manuals, and the like) regarding one or more system faults.

Further, in large systems with potentially large numbers of faults, individual server nodes may include a local "touch-of-a-button" mechanism where a user may press a button located on a single server node and the server fault notification system 100 may display fault information associated with that particular node. Activation of the local "touch-of-a-button" mechanism may further serve to offload current work away from a selected server node in anticipation of servicing.

The server fault notification system 100 may employ a system of light emitting diode (LED) indicators associated with various hardware components which are disposed substantially adjacent to those hardward components. These LEDs may be configured to be illuminated in response to a detected system fault in an associated hardware component.

Server-based systems may be highly scalable networks requiring varying levels of flexibility with regard to the configuration of fault diagnosis and notification. Smaller implementations may be more regularly serviced by a customer rather that a trained service professional. As such, the degree of desired direction to be provided via the LED indicators may be great. In such an implementation, a more directed LED-based service system may be appropriate (e.g. the Light Path™ brand of products and services provided by International Business Machines). Larger implementations may be more likely to be serviced by a trained service professional. As such, the degree of desired direction to be provided via the LED indicators may be less. In such an implementation, a more generalized LED-based service system may be appropriate (e.g. the Guiding Light™ brand of products and services provided by International Business Machines). In order to facilitate scalability, the server fault notification system 100 may allow customization regarding the type of LED diagnostic information that may be provided so as to permit the selection of a desired LED-based service mechanism.

Following are various exemplary embodiments of the server fault notification system 100 as depicted in FIG. 1. The server fault notification system 100 may include one or more server banks 101 and one or more fault notification management devices 102 (e.g. fault notification management devices 102A-102D).

The fault notification management devices 102 may include one or more integrated fault notification management devices 102A/102B. The integrated fault notification management devices 102A/102B may include devices which are resident within server banks 101 or configured to be coupled to the server banks 101 (e.g. a pluggable device).

The fault notification management devices 102 may include one or more one or more networked fault notification management devices 102C. The networked fault notification management devices 102C may include devices which are remote with respect to server banks 101 and operably coupled to the server banks 101 via a network connection.

The fault notification management devices 102 may include one or more one or more mobile fault notification management devices 102D. The mobile fault notification management devices 102D may be wireless devices such as PDAs, mobile phones (e.g. an iPhone® device, a BlackBerry® device, a Palm® device), wireless laptop computers, and the like.

The fault notification management devices 102 may include a fault notification interface 102-1. A fault notification interface 102-1 may include multimedia components such as a display monitor, audio speakers, LEDs and the like so as to provide system fault information to a service provider. The fault notification management devices 102 may include a fault notification controller 102-2. The fault notification controller 102-2 may include various processing logic and memory components configured to detect various user inputs and system fault instances and provide diagnostic information to a service provider via the fault notification interface 102-1. The fault notification management devices 102 may include one or more network fault status indicators 102-3. The network fault status indicators 102-3 may be push-button LEDs or touch-screen icons which may be illuminated in response to a detection of a system fault by the fault notification controller 102-2.

The server banks 101 may include one more server nodes 103 (e.g. server nodes 103A and 103B). The server nodes 103 may include hardware components employing one or more instruction sets including, but not limited to, x86 based hardware components, PowerPC based hardware components, and the like. Such server nodes 103 may include various models of blade-type server components. The server nodes 103 may include one or more server node fault controllers 103-1. The server node fault controllers 103-1 may include various processing logic and memory components configured to detect various fault instances resulting from faults in server node hardware components 103-2 (e.g. memory, processors, power management, and the like). The server node fault controllers 103-1 may broadcast fault information back to one or more fault notification management devices 102.

The server nodes 103 may include one or more server node fault status indicators 103-3. The server node fault status indicators 103-3 may be push-button LEDs or touch-screen icons which may be illuminated in response to a detection of a system fault in one or more server node hardware components 103-2 of a server node 103 by the fault notification controller 102-2. The server node fault status indicators 103-3 may be disposed on an exterior surface of a chassis of the server nodes 103 so as to present a readily observable indicator that one or more server node hardware components 103-2 within a particular server node 103 may have a fault.

The server nodes 103 may include one or more server node hardware component fault status indicators 103-4. The server node hardware component fault status indicators 103-4 may be LEDs or display icons which may be illuminated in response to a detection of a system fault in a particular server node hardware component 103-2. The server node hardware component fault status indicators 103-4 may be operably coupled to or in proximity to a particular server node hardware component 103-2 with which it is associated. Such server node hardware component fault status indicators 103-4 may be part of directed-servicing system configured to sequentially illuminate various indicators to direct servicing personnel to a faulty hardware component. Such directed-servicing systems may include the Light Path™ and Guiding Light™ brand of products and services provided by International Business Machines.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 2:
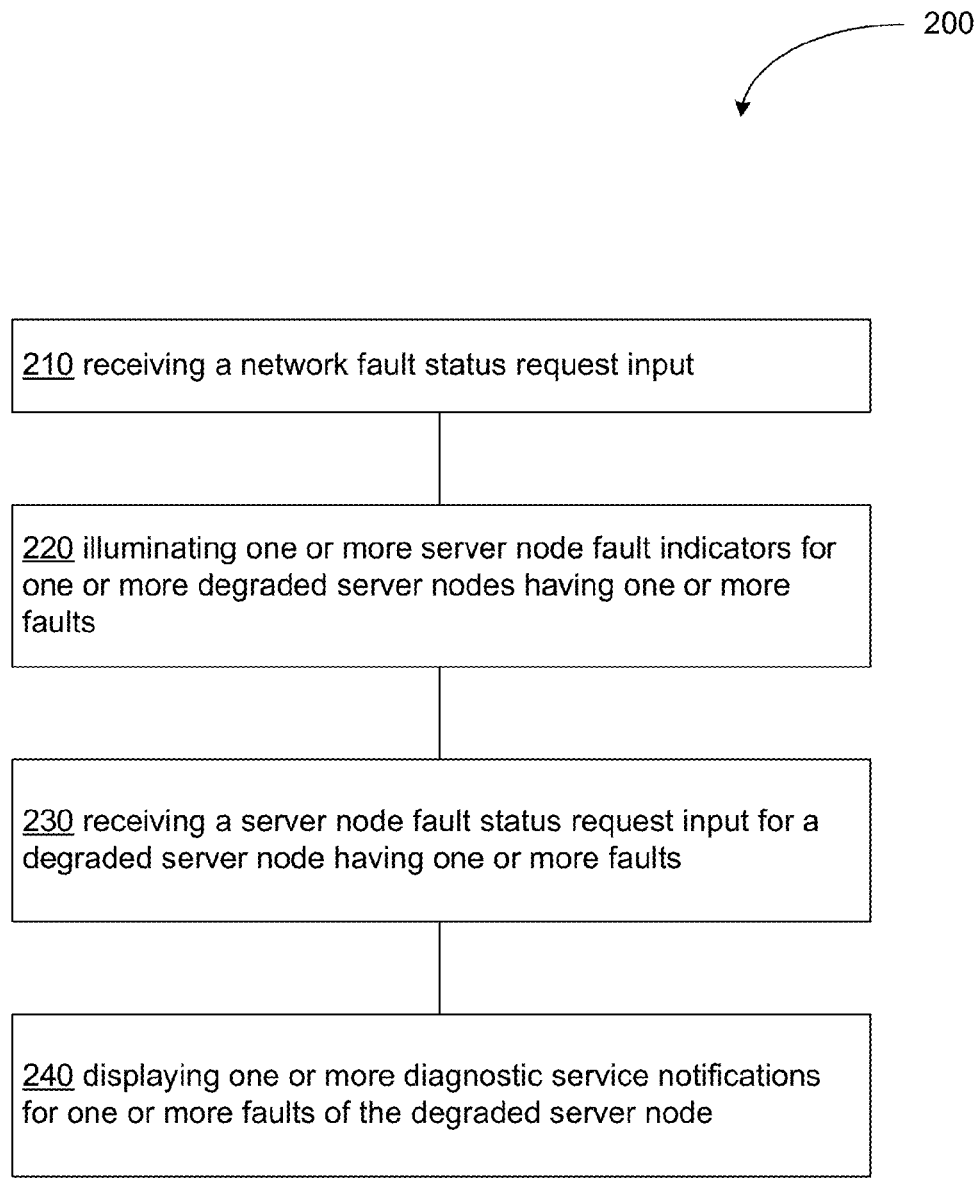
FIG. 2 is a high-level logic flowchart of a process.

FIG. 2 illustrates an operational flow 200 representing example operations related to providing server fault notifications. In FIG. 2 and in following figures that include various examples of operational flows, discussion and explanation may be provided with respect to the above-described examples of FIG. 1, and/or with respect to other examples and contexts. However, it should be understood that the operational flows may be executed in a number of other environments and contexts, and/or in modified versions of FIG. 1. Also, although the various operational flows are presented in the sequence(s) illustrated, it should be understood that the various operations may be performed in other orders than those that are illustrated, or may be performed concurrently.

Operation 210 depicts receiving a network fault status request input. For example, as shown in FIG. 1, the fault notification controller 102-2 of one or more fault notification management devices 102 may receive one or more fault notifications from the one or more server node fault controllers 103-1 indicating the existence of one or more faults in one or more server nodes 103 within the one or more server banks 101. Upon receiving the fault notifications, the fault notification controller 102-2 may cause an LED or display icon associated with the network fault status indicators 102-3 to illuminate to notify a user of the fault conditions. Upon notification, a user may provide an input requesting additional fault status information regarding the fault conditions.

Operation 220 depicts illuminating one or more server node fault indicators for one or more degraded server nodes having one or more faults. For example, as shown in FIG. 1, upon receiving a network fault status request input from a user, the fault notification controller 102-2 of one or more fault notification management devices 102 may cause the server node fault status indicators 103-3 associated with individual server nodes 103 having detected faults to be illuminated (e.g. server node fault status indicator 103-3' of server node 103A') so as to notify a user of those particular server nodes 103 having detected faults.

Operation 230 depicts receiving a server node fault status request input for a degraded server node having one or more faults. For example, as shown in FIG. 1, upon notification of particular server nodes 103 having detected faults (i.e. a degraded server), a user may provide an input requesting additional fault status information regarding the fault conditions of a particular server node 103 (e.g. server node 103A').

Operation 240 depicts displaying one or more diagnostic service notifications for one or more faults of the degraded server node. For example, as shown in FIG. 1, upon receiving a server node fault status request input for a degraded server node having one or more faults, the fault notification controller 102-2 of one or more fault notification management devices 102 may cause the fault notification interface 102-1 of the fault notification management devices 102 to present diagnostic information regarding the faults in a selected server node 103 (e.g. server node 103A') to the user. For example, the fault notification interface 102-1 may provide detailed error information, service contact information, replacement component part numbers, servicing instructions, online manuals, and the like.

Figure 3:
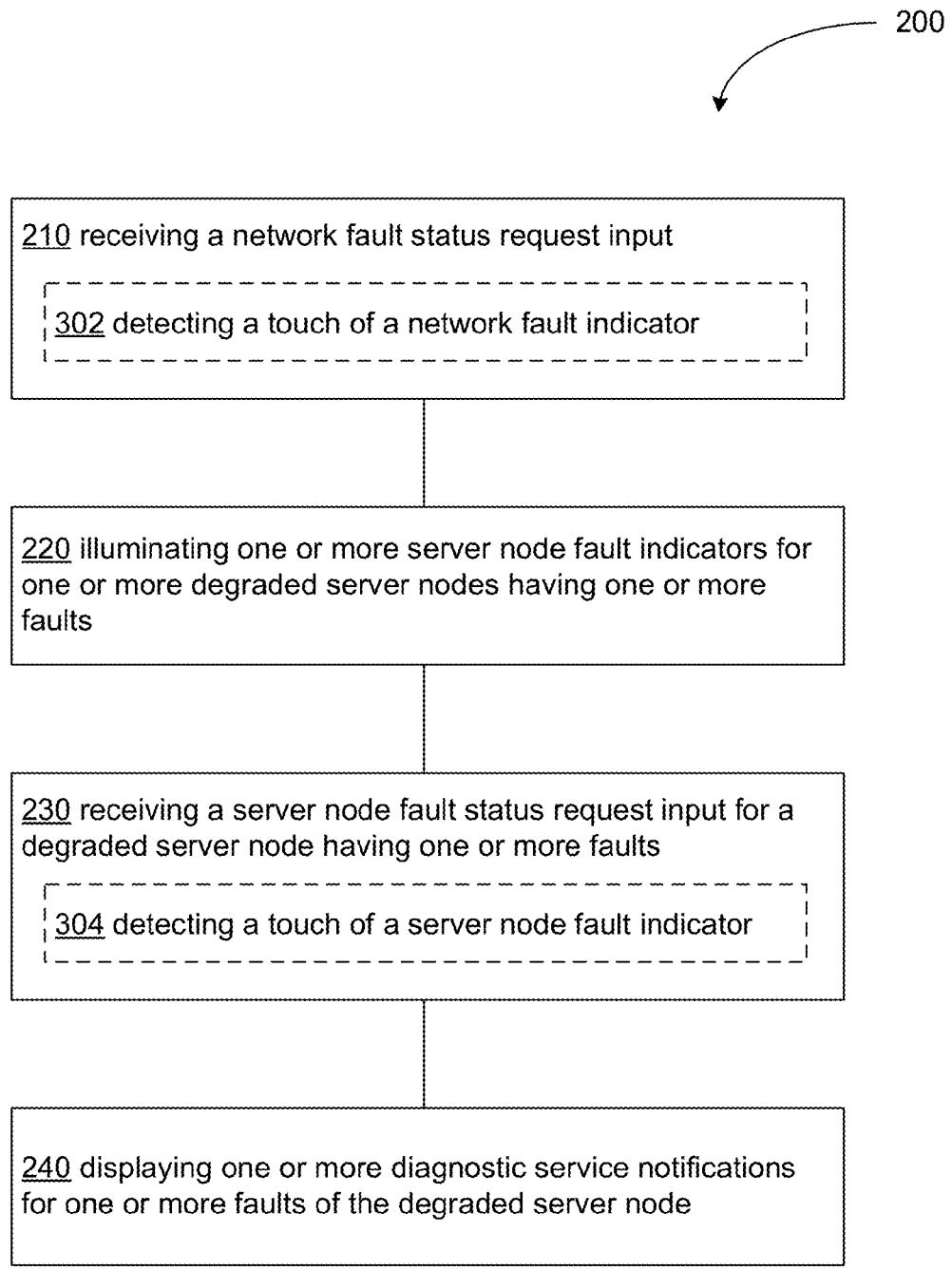
FIG. 3 is a high-level logic flowchart of a process.

The display of the diagnostic service notifications may allow user to complete various service operations associated with the service notifications once the information specific to a fault is presented and understood by the user. Such actions may include placing a system in standby mode, transferring workloads to other systems, initiating a firmware update, placing the system in a mode that allows for physical maintenance, or ordering parts associated with one or more faults FIG. 3 illustrates alternative embodiments of the example operational flow 200 of FIG. 2. FIG. 3 illustrates example embodiments where the operational flow 200 may include at least one additional operation. Additional operations may include operation 302 and/or operation 304.

Operation 302 depicts an embodiment where the receiving a network fault status request input of Operation 210 includes detecting a touch of a network fault indicator. For example, as shown in FIG. 1, the fault notification controller 102-2 of one or more fault notification management devices 102 may receive one or more fault notifications from the one or more server node fault controllers 103-1 indicating the existence of one or more faults in one or more server nodes 103 within the one or more server banks 101. The network fault status indicators 102-3 may include LED touch-buttons and/or touch-screen icons. Upon receiving the fault notifications, the fault notification controller 102-2 may cause the LED touch-button or touch-screen icon to illuminate to notify a user of the fault conditions. Upon notification, a user may physically press the LED touch-buttons and/or touch-screen icons of the network fault status indicators 102-3 to request additional fault status information regarding the fault conditions. The fault notification controller 102-2 may detect a signal associated with the physical depression of the LED touch-buttons and/or touch-screen icons of the network fault status indicators 102-3 indicative of a user making a network fault status request.

Operation 304 depicts an embodiment where receiving a server node fault status request input for a degraded server node having one or more faults of Operation 230 may include detecting a touch of a server node fault indicator. For example, as shown in FIG. 1, the server node fault status indicators 103-3 may include LED touch-buttons and/or touch-screen icons. Upon receiving a network fault status request input, the fault notification controller 102-2 may cause the LED touch-button or touch-screen icon to illuminate to notify a user of the fault conditions within a particular server node 103 (e.g. server node 103A'). Upon notification of particular server nodes 103 having detected faults (i.e. a degraded server), a user may physically press the LED touch-buttons and/or touch-screen icons of the network fault status indicators 102-3 to request additional fault status information regarding the fault conditions. The fault notification controller 102-2 may detect a signal associated with the physical depression of the LED touch-buttons and/or touch-screen icons of the server node fault status indicators 103-3 indicative of a user making a server node fault status request.

Figure 4:
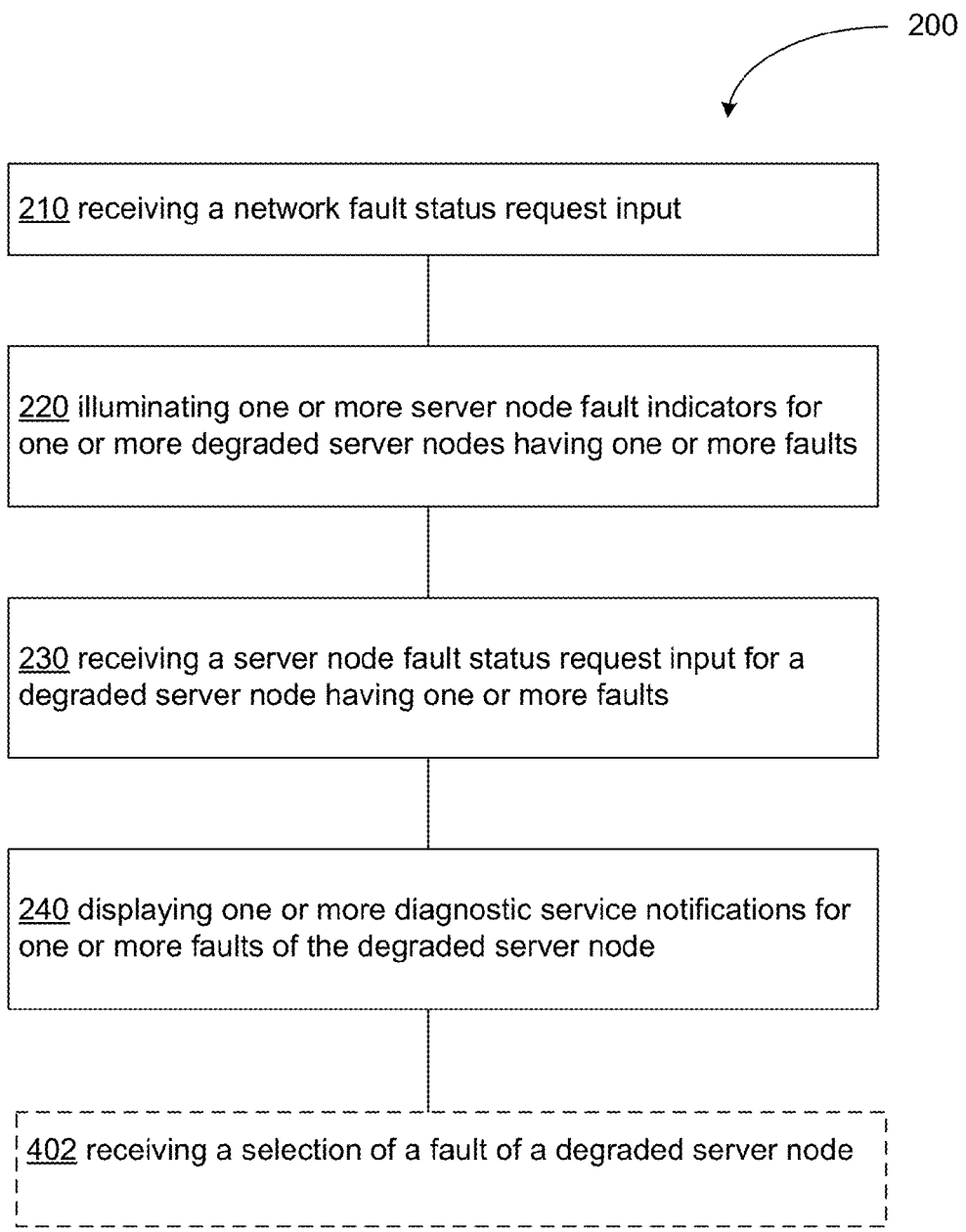
FIG. 4 is a high-level logic flowchart of a process.

FIG. 4 illustrates alternative embodiments of the example operational flow 200 of FIG. 2. FIG. 4 illustrates example embodiments where the operation 200 may include at least one additional operation. Additional operations may include operation 402.

Operation 402 depicts receiving a selection of a fault of a degraded server node. For example, as shown in FIG. 1, upon receiving a server node fault status request input for a degraded server node having one or more faults, the fault notification controller 102-2 may display one or more diagnostic service notifications for the one or more faults of the degraded server node on the fault notification interface 102-1 of the fault notification management devices 102 (e.g. displaying messages listing multiple faults in a degraded server node 103A' on a touch-screen fault notification interface 102-1). A user may select one or more of the displayed faults in order to obtain additional details regarding those faults. For example, the user may press a display icon associated with a particular fault as displayed on a touch-screen fault notification interface 102-1 and the fault notification controller 102-2 may cause the fault notification interface 102-1 to display additional information to the user regarding the selected fault.

Figure 5:
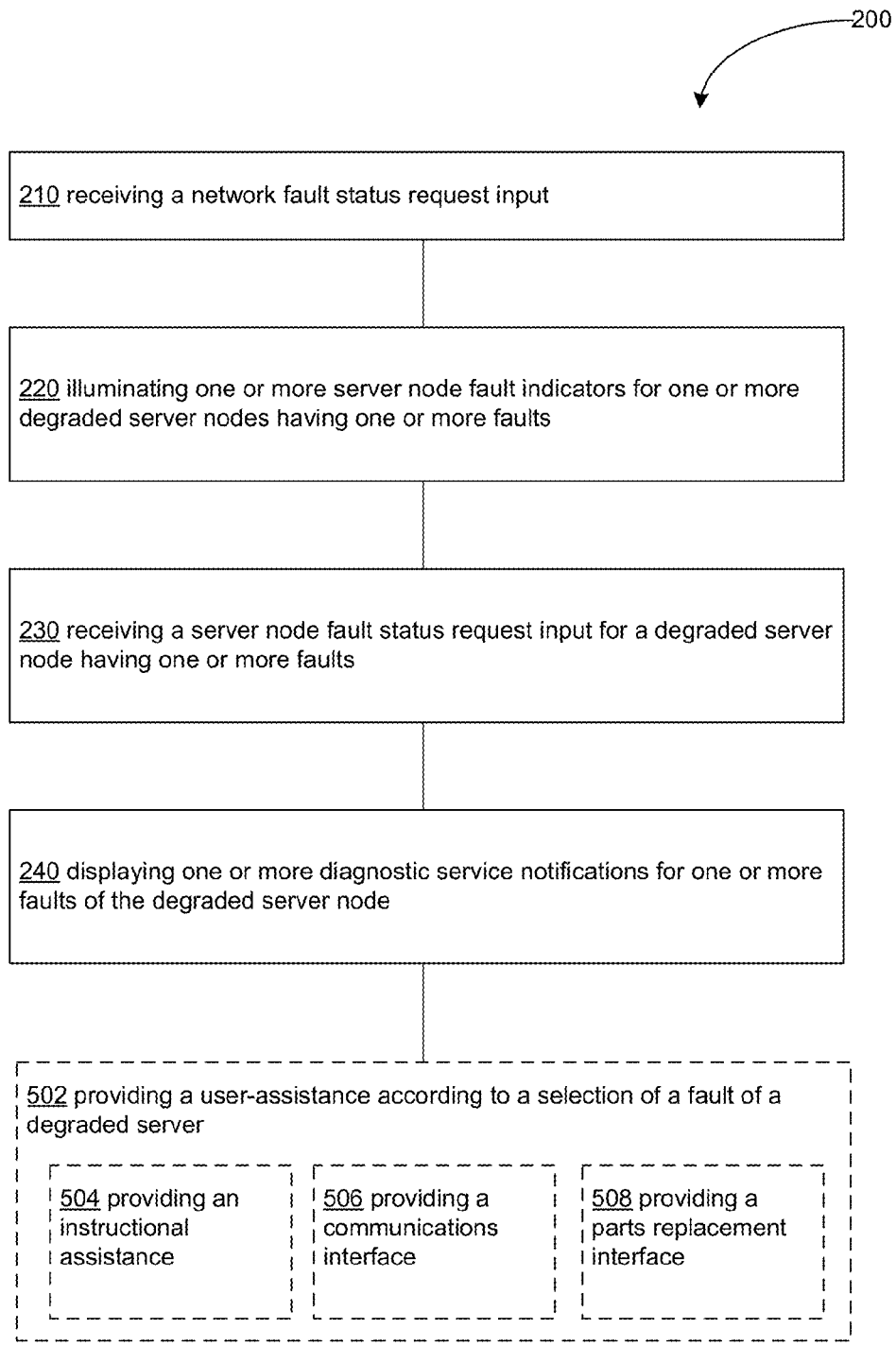
FIG. 5 is a high-level logic flowchart of a process.

FIG. 5 illustrates alternative embodiments of the example operational flow 200 of FIG. 2. FIG. 5 illustrates example embodiments where the operational flow 200 may include at least one additional operation. Additional operations may include operation 502, and/or an operation 504, and/or an operation 506.

Operation 502 depicts providing a user-assistance according to a selection of a fault of a degraded server. For example, as shown in FIG. 1, a user may select one or more faults displayed on a fault notification interface 102-1 in order to obtain additional details regarding those faults. Those additional details may include information which may assist the user in servicing the selected faults. The user-assistance information may be presented via the fault notification interface 102-1.

Operation 504 depicts an embodiment where providing a user-assistance according to a selection of a fault of a degraded server of Operation 502 may include providing an instructional assistance. For example, as shown in FIG. 1, information may be presented to a user via the fault notification interface 102-1 instructing the user regarding servicing procedures associated with a selected fault. For example, the instructional assistance may provide information regarding accessing server banks 101, location and removal of a faulty server node hardware component 103-2', and the like.

Operation 506 depicts an embodiment where providing a user-assistance according to a selection of a fault of a degraded server of Operation 502 may include providing a communications interface. For example, as shown in FIG. 1, the fault notification interface 102-1 may present a communications interface to a user. The communications interface may include a VoIP interface, an instant messaging interface, a video conference interface, an e-mail interface, and the like. The communications interface may be operably connected to a dedicated support network (e.g. a service center 104) or an external network (e.g. the Internet 105) so as to allow a user to access servicing information from the networks.

Operation 508 depicts an embodiment where providing a user-assistance according to a selection of a fault of a degraded server of Operation 502 may include providing a component replacement interface. For example, as shown in FIG. 1, the fault notification interface 102-1 may present a component replacement interface. The component replacement interface may include a web application connecting to a supplier via a network (e.g. the Internet 105) to facilitate the ordering of replacements for various components (e.g. replaceable server node hardware components 103-2 such as memory elements, processors, power management, associated software/firmware, and the like). The component replacement interface may include a listing of components which may be required to be replaced in the course of servicing a particular selected fault (e.g. a selected fault associated with a memory server node hardware component 103-2' may result in the presentation of a web application for ordering that specific component from a vendor known to carry that component).

Figure 6:
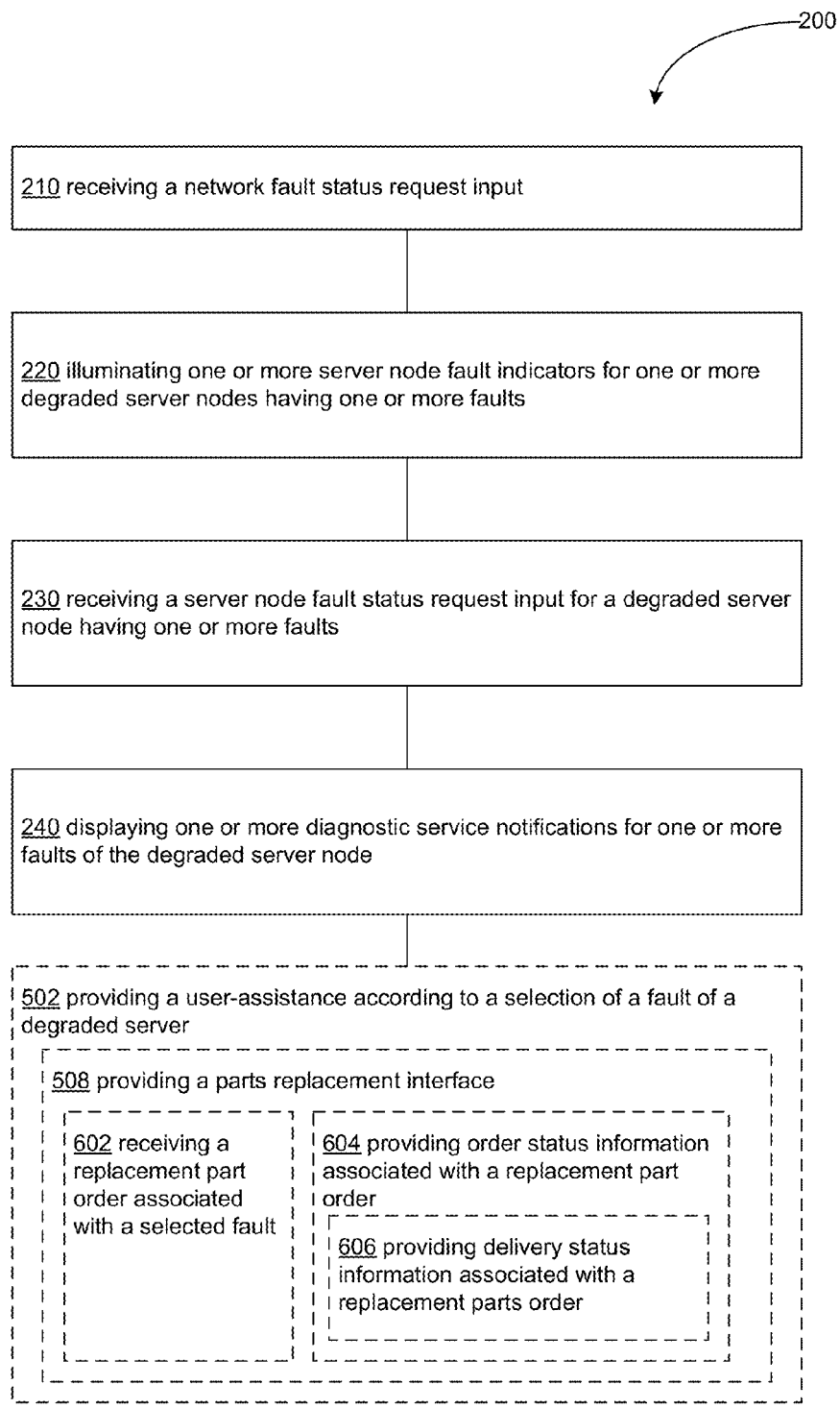
FIG. 6 is a high-level logic flowchart of a process.

FIG. 6 illustrates alternative embodiments of the example operational flow 200 of FIG. 5. FIG. 6 illustrates example embodiments where the operation 508 may include at least one additional operation. Additional operations may include operation 602 and/or an operation 604.

Operation 602 depicts an embodiment where the providing a component replacement interface of Operation 508 may include receiving a replacement component order associated with a selected fault. For example, as shown in FIG. 1, the fault notification interface 102-1 may present a component replacement interface. The component replacement interface may include a web application connecting to a supplier via a network (e.g. the Internet 105). The component replacement interface may display a listing of replacement components associated with a selected fault that may be available from one or more parts suppliers. The parts replacement interface may allow a user to select a particular replacement part and place an order for that part with the supplier. The fault notification controller 102-2 may detect a signal associated with a user input (e.g. depression of a keyboard key, mouse key, touch screen panel, etc.) indicative of a user making selection of a particular replacement components associated with a selected fault.

Operation 604 depicts an embodiment where the providing a component replacement interface of Operation 508 may include providing order status information associated with a replacement component order. For example, as shown in FIG. 1, the fault notification interface 102-1 may present a component replacement interface. The component replacement interface may include a web application connecting to a component supplier via a network (e.g. the Internet 105). The component replacement interface may display a listing of replacement components previously ordered via the component replacement interface and the status (e.g. pending, filled, shipped, date ordered, etc.) of those orders.

Operation 606 depicts an embodiment where the providing order status information associated with a replacement component order of operation 604 may include providing delivery status information associated with the replacement component order. For example, as shown in FIG. 1, the fault notification interface 102-1 may present a component replacement interface. The component replacement interface may include a web application connecting to a supplier via a network (e.g. the Internet 105). The component replacement interface may display a listing of replacement components previously ordered via the component replacement interface and the delivery status (e.g. estimated shipping date, date shipped from supplier, shipping routing information, estimated delivery date, current shipment location, etc.) of those orders.

Figure 7:
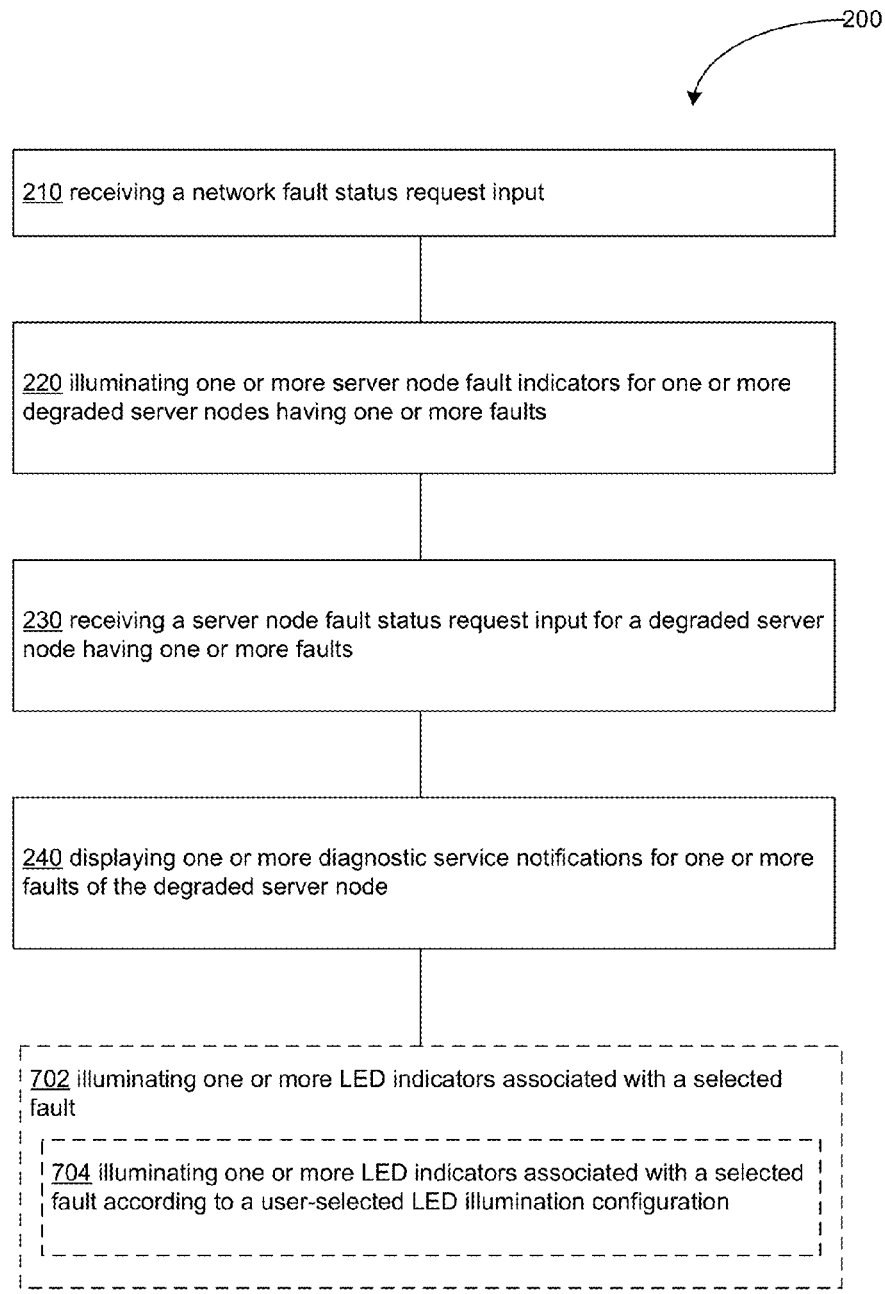
FIG. 7 is a high-level logic flowchart of a process.

FIG. 7 illustrates alternative embodiments of the example operational flow 200 of FIG. 4. FIG. 7 illustrates example embodiments where the operation 404 may include at least one additional operation. Additional operations may include operation 702, and/or an operation 704.

Operation 702 depicts an embodiment where providing a user-assistance according to a selection of a fault of a degraded server of Operation 404 may include illuminating one or more LED indicators associated with a selected fault. For example, as shown in FIG. 1, upon selection by a user of a particular fault of associated with a server node hardware component 103-2', one or more server node hardware component fault status indicators 103-4' associated with the faulty server node hardware component 103-2' may be illuminated. The server node hardware component fault status indicators 103-4' may be a component of a LED-based directed servicing diagnostic system (e.g. the Light Path™ and Guiding Light™ brand of products and services provided by International Business Machines).

Operation 704 depicts an embodiment where illuminating one or more LED indicators associated with a selected fault of Operation 702 may include illuminating one or more LED indicators associated with a selected fault according to a user-selected LED illumination configuration. For example, the fault notification interface 102-1 of the fault notification management devices 102 may provide a user interface allowing a user to select between multiple LED-based directed servicing mechanisms. For example, a user may select between using the Light Path™ and Guiding Light™ brand of products and services provided by International Business Machines. Following the selection, the server node hardware component fault status indicators 103-4' associated with the selected LED-based directed servicing mechanism may be illuminated upon the selection of a particular faulty server node hardware component 103-2'.

Figure 8:
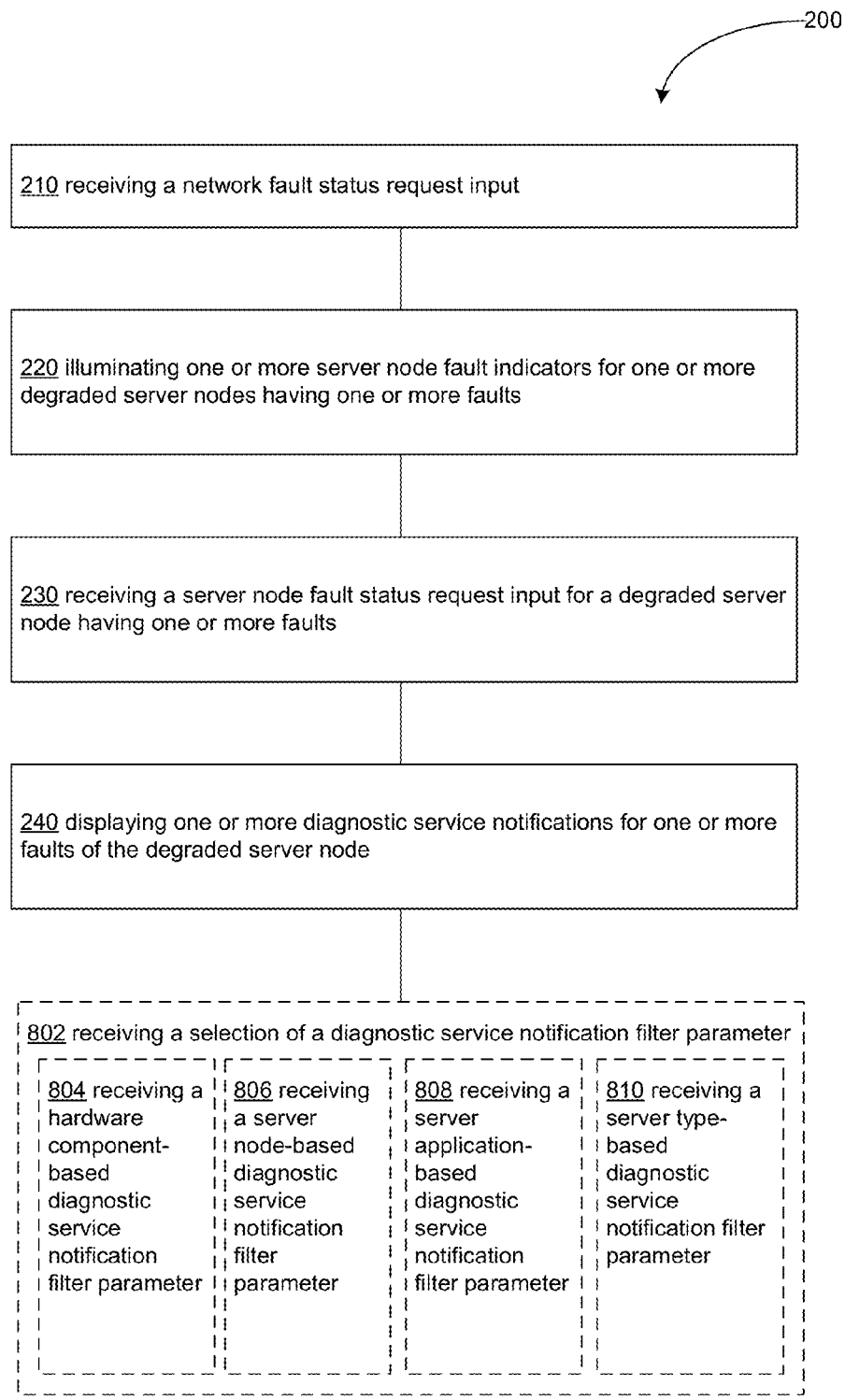
FIG. 8 is a high-level logic flowchart of a process.

FIG. 8 illustrates alternative embodiments of the example operational flow 200 of FIG. 2. FIG. 8 illustrates example embodiments where the operational flow 200 may include at least one additional operation. Additional operations may include operation 802, and/or an operation 804.

Operation 802 depicts receiving a selection of a diagnostic service notification filter parameter. For example, as shown in FIG. 1, upon displaying one or more diagnostic service notifications for one or more faults of the degraded server node, a user may filter the notification results to isolate particular faults. The fault notification interface 102-1 of the fault notification management devices 102 may provide a user interface allowing a user to select or input a diagnostic service notification filter parameter to reduce the number of displayed service notifications to only those having a particular characteristic corresponding to the filter parameter.

Operation 804 depicts an embodiment where receiving a selection of a diagnostic service notification filter parameter of Operation 802 may include receiving a hardware component-based diagnostic service notification filter parameter. For example, as shown in FIG. 1, the fault notification interface 102-1 of the fault notification management devices 102 may provide a user interface allowing a user to select or input a hardware component filter parameter such that the fault notification interface 102-1 will display only those diagnostic service notifications associated with particular server node hardware components 103-2 (e.g. only memory components, only processing components, only power supply components, and the like) having the characteristic corresponding to the hardware component filter parameter.

Operation 806 depicts an embodiment where receiving a selection of a diagnostic service notification filter parameter of Operation 802 may include receiving a server node-based diagnostic service notification filter parameter. For example, as shown in FIG. 1, the fault notification interface 102-1 of the fault notification management devices 102 may provide a user interface allowing a user to select or input a server node filter parameter such that the fault notification interface 102-1 will display only those diagnostic service notifications associated with particular server node 103 (e.g. degraded server node 103A').

Operation 808 depicts an embodiment where receiving a selection of a diagnostic service notification filter parameter of Operation 802 may include receiving a server application-based diagnostic service notification filter parameter. For example, as shown in FIG. 1, the fault notification interface 102-1 of the fault notification management devices 102 may provide a user interface allowing a user to select or input a server application filter parameter such that the fault notification interface 102-1 will display only those diagnostic service notifications associated with server banks 101 and/or server nodes 103 running particular software and/or firmware applications.

Operation 810 depicts an embodiment where receiving a selection of a diagnostic service notification filter parameter of Operation 802 may include receiving a server type-based diagnostic service notification filter parameter. For example, as shown in FIG. 1, the fault notification interface 102-1 of the fault notification management devices 102 may provide a user interface allowing a user to select or input a server type filter parameter such that the fault notification interface 102-1 will display only those diagnostic service notifications associated with server banks 101 and/or server nodes 103 containing particular server types (e.g. displaying only service notifications for those servers employing x86 based hardware components, displaying only service notifications for those servers employing PowerPC based hardware components, displaying only service notifications for a particular model of blade-type server components, and the like).

Figure 9:
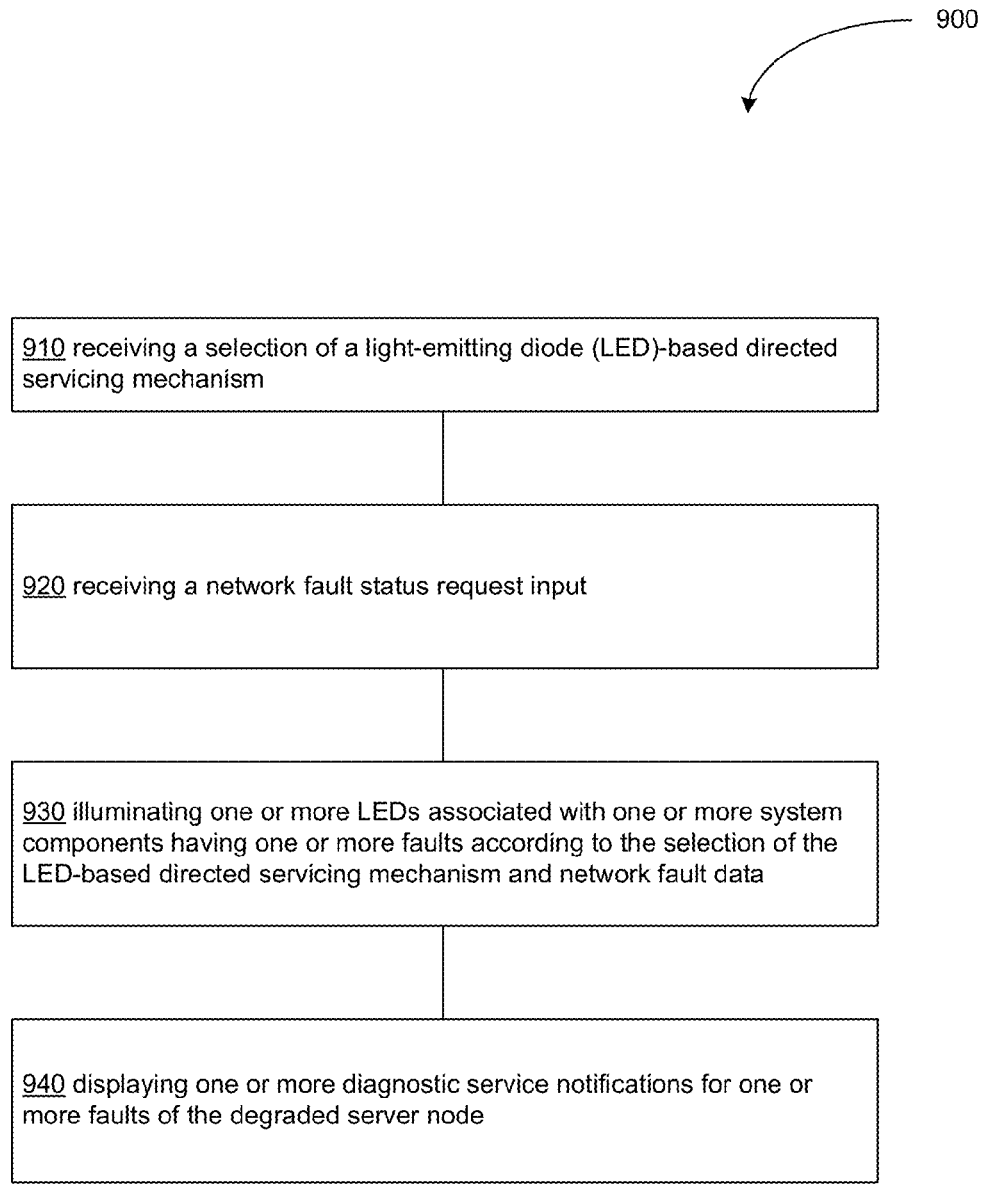
FIG. 9 is a high-level logic flowchart of a process.

FIG. 9 illustrates an operational flow 900 representing example operations related to providing server fault notifications. In FIG. 9 and in following figures that include various examples of operational flows, discussion and explanation may be provided with respect to the above-described examples of FIG. 1, and/or with respect to other examples and contexts. However, it should be understood that the operational flows may be executed in a number of other environments and contexts, and/or in modified versions of FIG. 1. Also, although the various operational flows are presented in the sequence(s) illustrated, it should be understood that the various operations may be performed in other orders than those that are illustrated, or may be performed concurrently.

Operation 910 depicts receiving a selection of a light-emitting diode (LED)-based directed servicing mechanism. For example, as shown in FIG. 1, the fault notification management devices 102 may provide a user interface allowing a user to select a mechanism by which the server fault notification system 100 may provide LED-based directed servicing assistance. A user may select an LED-based directed servicing mechanism which corresponds to their particular network implementation. For example, smaller implementations may be more regularly serviced by a customer rather that a trained service professional. As such, the degree of desired direction to be provided via the LED indicators may be great. In such an implementation, a user may select a highly directed LED-based service mechanism may be appropriate (e.g. the Light Path™ brand of products and services provided by International Business Machines). Larger implementations may be more likely to be serviced by a trained service professional. As such, the degree of desired direction to be provided via the LED indicators may be less. In such an implementation, a more generalized LED-based service system may be selected (e.g. the Guiding Light™ brand of products and services provided by International Business Machines).

Operation 920 depicts receiving a network fault status request input. For example, as shown in FIG. 1, the fault notification controller 102-2 of one or more fault notification management devices 102 may receive one or more fault notifications from the one or more server node fault controllers 103-1 indicating the existence of one or more faults in one or more server nodes 103 within the one or more server banks 101. Upon receiving the fault notifications, the fault notification controller 102-2 may cause an LED button or touch-screen display icon associated with the network fault status indicators 102-3 to illuminate to notify a user of the fault conditions. Upon notification, a user may provide an input (e.g. pressing the LED button or touch-screen) requesting additional fault status information regarding the fault conditions (e.g. LED-based directed servicing assistance, fault-specific support information, and the like).

Operation 930 depicts illuminating one or more LEDs associated with one or more system components having one or more faults according to the selection of the LED-based directed servicing mechanism and network fault data. For example, as shown in FIG. 1, upon receiving a selection of a light-emitting diode (LED)-based directed servicing mechanism and a network fault status request input from a user, the fault notification controller 102-2 of one or more fault notification management devices 102 may cause the server node fault status indicators 103-3 associated with individual server nodes 103 having detected faults to be illuminated (e.g. server node fault status indicator 103-3' of server node 103A') so as to notify a user of those particular server nodes 103 having detected faults. The server node fault status indicators 103-3 may be illuminated according to the selected LED-based directed servicing mechanism (e.g. according to a highly directed LED-based service mechanism such as the Light Path™ brand of products and services provided by International Business Machines or a more generalized LED-based service such as the Guiding Light™ brand of products and services provided by International Business Machines. The one or or more LEDs may be illuminated in a sequence corresponding to a path associated with locating the one or more components having one or more faults (e.g. as in the Light Path™ or Guiding Light™ brand of products).

Operation 940 depicts displaying one or more diagnostic service notifications for one or more faults of the degraded server node. For example, as shown in FIG. 1, upon receiving a server node fault status request input for a degraded server node having one or more faults, the fault notification controller 102-2 of one or more fault notification management devices 102 may cause the fault notification interface 102-1 of the fault notification management devices 102 to present diagnostic information regarding the faults in a selected server node 103 (e.g. server node 103A') to the user. For example, the fault notification interface 102-1 may provide detailed error information, service contact information, replacement component part numbers, servicing instructions, online manuals, and the like.

Figure 10:
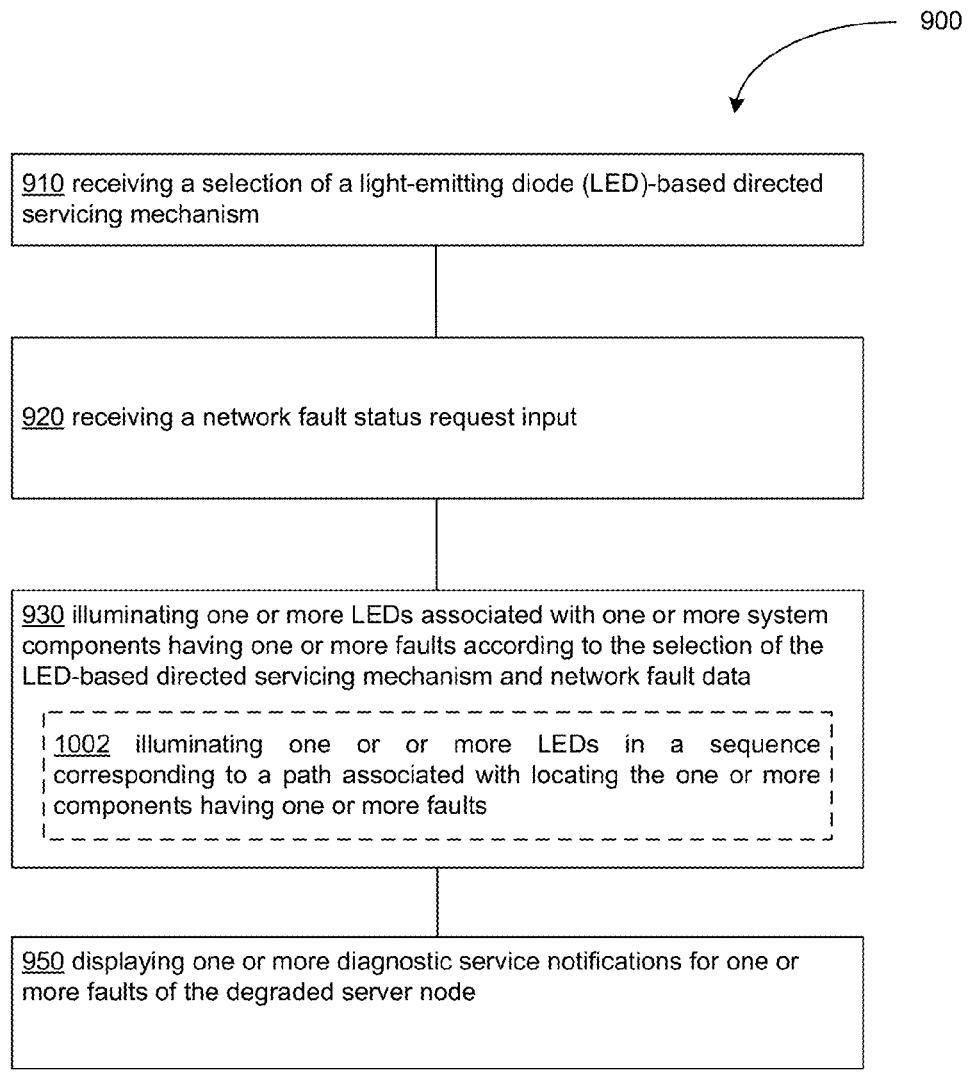
FIG. 10 is a high-level logic flowchart of a process.

FIG. 10 illustrates alternative embodiments of the example operational flow 900 of FIG. 9. FIG. 10 illustrates example embodiments where the operation 930 of operational flow 900 may include at least one additional operation. Additional operations may include operation 1002.

Operation 1002 depicts illuminating one or or more LEDs in a sequence corresponding to a path associated with locating the one or more components having one or more faults. For example, as shown in FIG. 1, upon receiving a selection of a light-emitting diode (LED)-based directed servicing mechanism and a network fault status request input from a user, the fault notification controller 102-2 of one or more fault notification management devices 102 may cause the server node fault status indicators 103-3 associated with individual server nodes 103 having detected faults to be illuminated (e.g. server node fault status indicator 103-3' of server node 103A') so as to notify a user of those particular server nodes 103 having detected faults. The server node fault status indicators 103-3 may be illuminated in a sequence corresponding to a path associated with locating the one or more components having one or more faults (e.g. as in the Light Path™ or Guiding Light™ brand of products).

Figure 11:
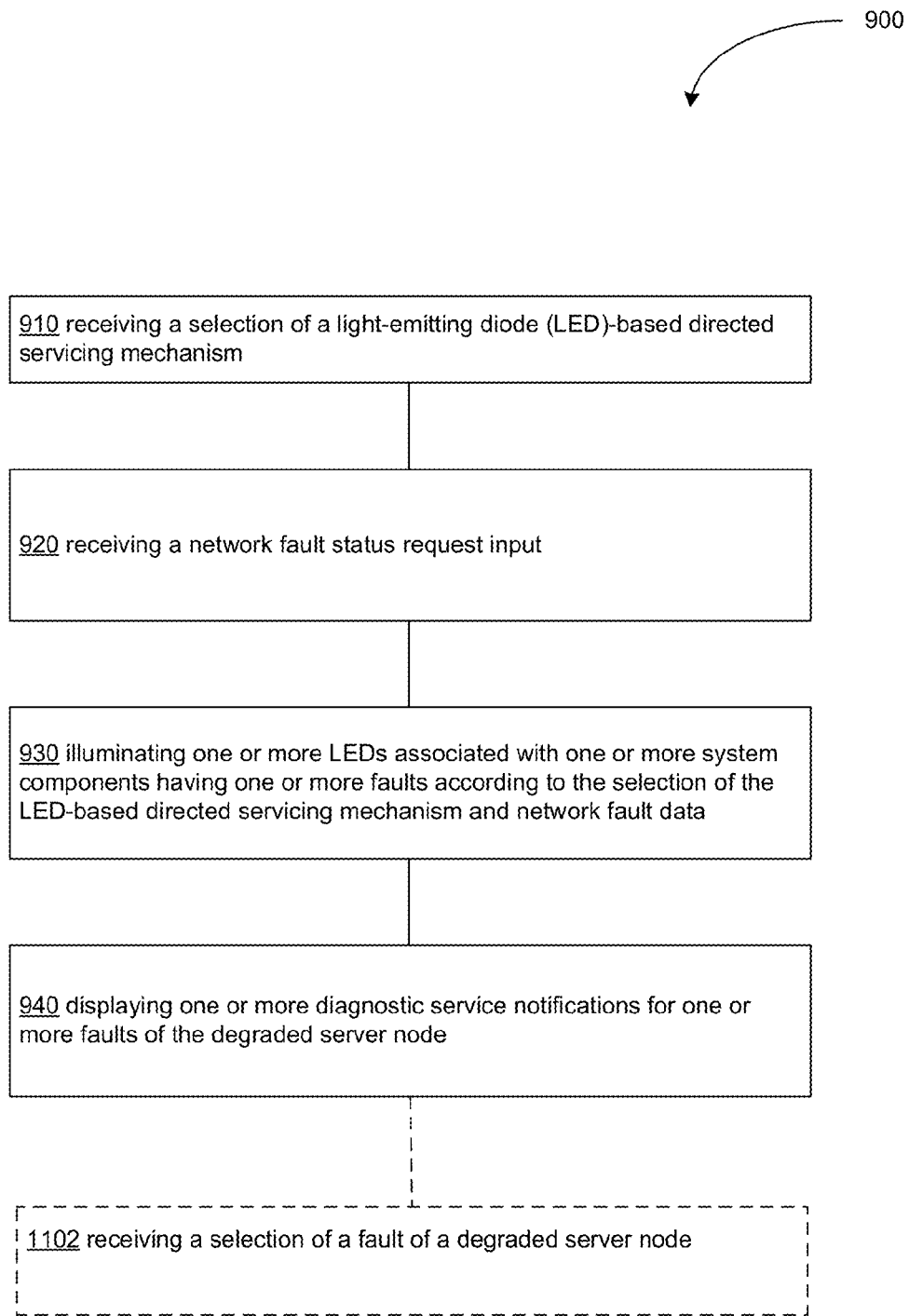
FIG. 11 is a high-level logic flowchart of a process.

FIG. 11 illustrates alternative embodiments of the example operational flow 900 of FIG. 9. FIG. 11 illustrates example embodiments where the operational flow 900 may include at least one additional operation. Additional operations may include operation 1102.

Operation 1102 depicts receiving a selection of a fault of a degraded server node. For example, as shown in FIG. 1, upon receiving a server node fault status request input for a degraded server node having one or more faults, the fault notification controller 102-2 may display one or more diagnostic service notifications for the one or more faults of the degraded server node on the fault notification interface 102-1 of the fault notification management devices 102 (e.g. displaying messages listing multiple faults in a degraded server node 103A' on a touch-screen fault notification interface 102-1). A user may select one or more of the displayed faults in order to obtain additional details regarding those faults. For example, the user may press a display icon associated with a particular fault as displayed on a touch-screen fault notification interface 102-1 and the fault notification controller 102-2 may cause the fault notification interface 102-1 to display additional information to the user regarding the selected fault.

Figure 12:
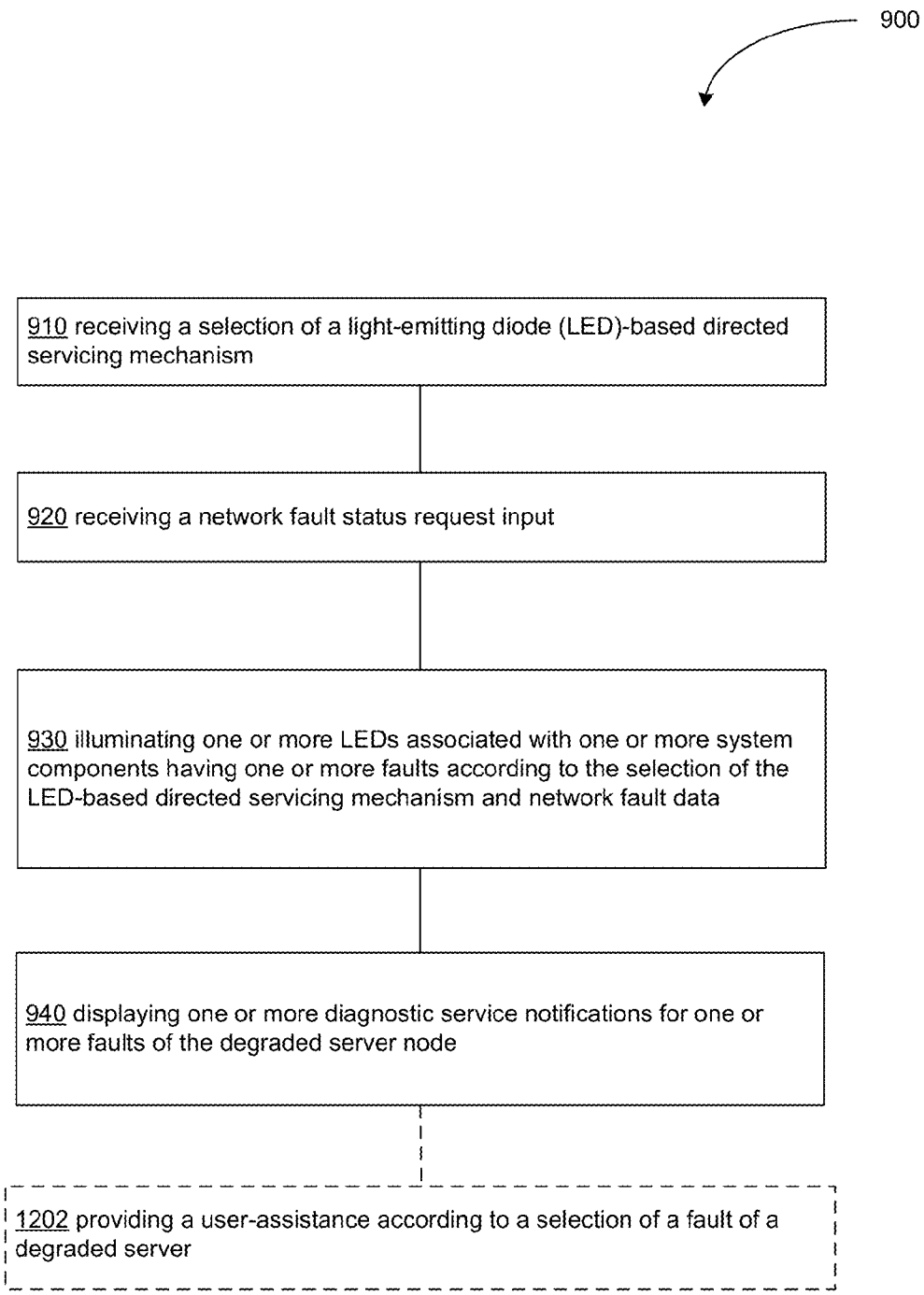
FIG. 12 is a high-level logic flowchart of a process.

FIG. 12 illustrates alternative embodiments of the example operational flow 900 of FIG. 9. FIG. 12 illustrates example embodiments where the operational flow 900 may include at least one additional operation. Additional operations may include operation 1202.

Operation 1202 depicts providing a user-assistance according to a selection of a fault of a degraded server. For example, as shown in FIG. 1, a user may select one or more faults displayed on a fault notification interface 102-1 in order to obtain additional details regarding those faults. Those additional details may include information which may assist the user in servicing the selected faults. The user-assistance information may be presented via the fault notification interface 102-1. The user-assistance may include an instructional assistance (e.g. servicing instructions) or the provision of a communications interface for obtaining servicing support or component replacement services.

Figure 13:
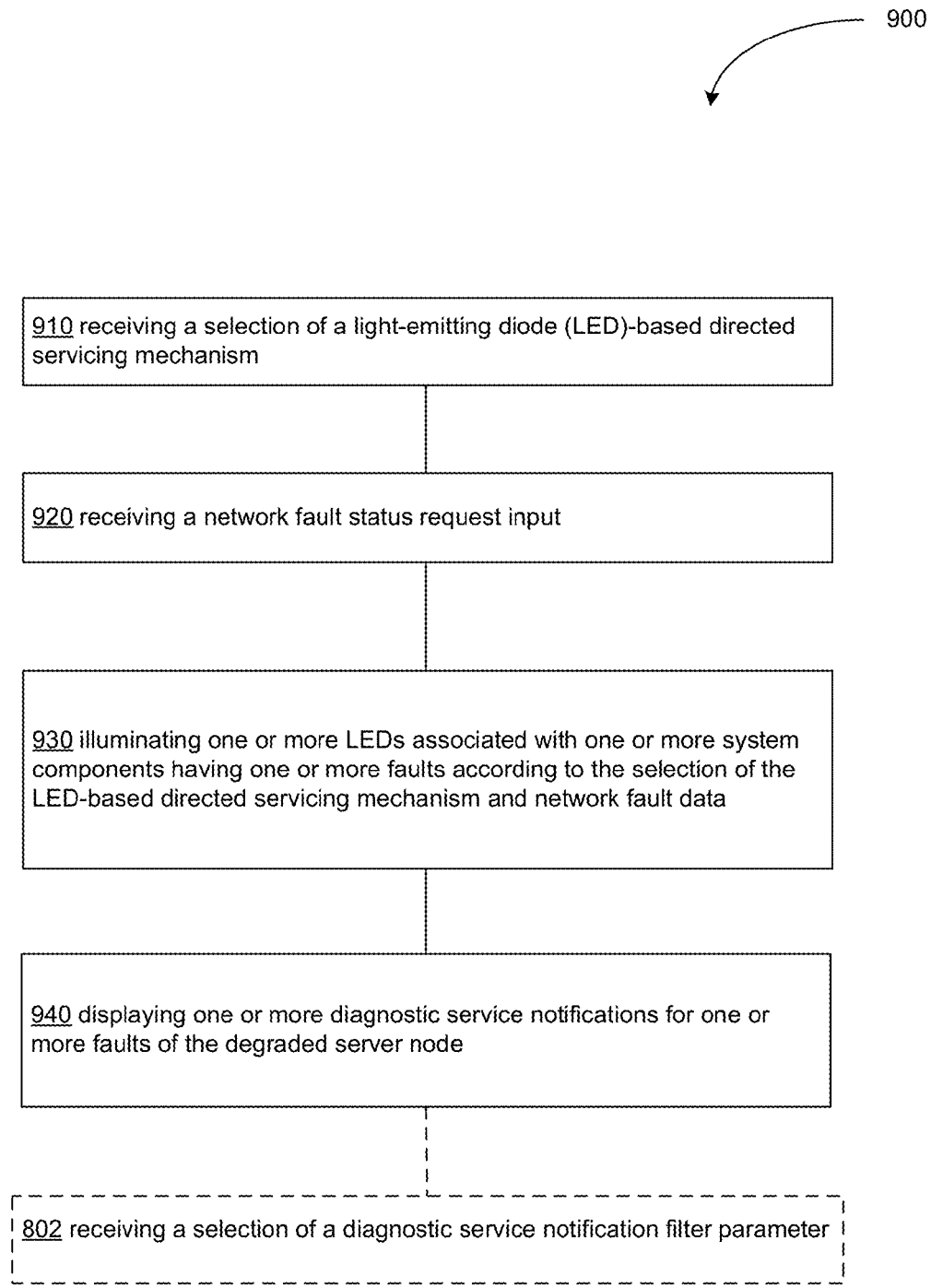
FIG. 13 is a high-level logic flowchart of a process.

FIG. 13 illustrates alternative embodiments of the example operational flow 900 of FIG. 9. FIG. 13 illustrates example embodiments where the operational flow 900 may include at least one additional operation. Additional operations may include operation 1302.

Operation 1302 depicts receiving a selection of a diagnostic service notification filter parameter. For example, as shown in FIG. 1, upon displaying one or more diagnostic service notifications for one or more faults of the degraded server node, a user may filter the notification results to isolate particular faults. The fault notification interface 102-1 of the fault notification management devices 102 may provide a user interface allowing a user to select or input a diagnostic service notification filter parameter to reduce the number of displayed service notifications to only those having a particular characteristic corresponding to the filter parameter. For example, a selected diagnostic service parameter may cause the fault notification interface 102-1 to only display fault notifications regarding a particular hardware component, server node, server application, server type, and the like.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit a device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into high-level descriptor languages (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, a solid state storage device (e.g. a USB drive), etc.; and a transmission type medium such as a digital and/or an analog communication medium (e.g., a fiber optic cable, a waveguide, a wired communications link, a wireless communication link (e.g., transmitter, transceiver, transmission logic, reception logic, etc.).

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those that are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to" or other past-tense adjectives are generally not intended to exclude such variants, unless context dictates otherwise.

Although specific dependencies have been identified in the claims, it is to be noted that all possible combinations of the features of the claims are envisaged in the present application, and therefore the claims are to be interpreted to include all possible multiple dependencies. It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for providing server fault notifications, the method comprising:
   receiving a selection of a light-emitting diode (LED)-based directed servicing mechanism;
   receiving a network fault status request input;
   illuminating one or more LEDs associated with one or more system components having one or more faults according to the selection of the LED-based directed servicing mechanism and network fault data, wherein the illuminating one or more LEDs associated with one or more system components having one or more faults according to the selection of the LED-based directed servicing mechanism and network fault data further comprises:
      illuminating one or more LEDs in a sequence corresponding to a path associated with locating the one or more components having one or more faults; and
   displaying one or more diagnostic service notifications for one or more faults of the degraded server node.

2. The method of claim 1, wherein the receiving a network fault status request input comprises:
   detecting a touch of a network fault indicator.

3. The method of claim 1, further comprising:
   receiving a selection of a fault of a degraded server node.

4. The method of claim 1, further comprising:
   providing a user-assistance according to a selection of a fault of a degraded server.

5. The method of claim 4, wherein the providing a user-assistance according to a selection of a fault of a degraded server comprises:
   providing an instructional assistance.

6. The method of claim 4, wherein the providing a user-assistance according to a selection of a fault of a degraded server comprises:
providing a communications interface.

7. The method of claim 4, wherein the providing a user-assistance according to a selection of a fault of a degraded server comprises:
providing a component replacement interface.

8. The method of claim 7, further comprising:
receiving a replacement component order associated with a selected fault.

9. The method of claim 7, wherein the providing a user-assistance according to a selection of a fault of a degraded server comprises:
providing order status information associated with a replacement component order.

10. The method of claim 9, wherein the providing order status information associated with a replacement component order comprises:
providing delivery status information associated with the replacement component order.

11. The method of claim 4, wherein the providing a user-assistance according to a selection of a fault of a degraded server comprises:
illuminating one or more LED indicators associated with a selected fault.

12. The method of claim 11, wherein the illuminating one or more LED indicators associated with a selected fault further comprises:
illuminating one or more LED indicators associated with a selected fault according to a user-selected LED illumination configuration.

13. The method of claim 1, further comprising:
receiving a selection of a diagnostic service notification filter parameter.

14. The method of claim 13, wherein the receiving a selection of a diagnostic service notification filter parameter comprises:
receiving a hardware component-based diagnostic service notification filter parameter.

15. The method of claim 13, wherein the receiving a selection of a diagnostic service notification filter parameter comprises:
receiving a server node-based diagnostic service notification filter parameter.

16. The method of claim 13, wherein the receiving a selection of a diagnostic service notification filter parameter comprises:
receiving a server application-based diagnostic service notification filter parameter.

17. The method of claim 13, wherein the receiving a selection of a diagnostic service notification filter parameter comprises:
receiving a server type-based diagnostic service notification filter parameter.

18. A system for providing server fault notifications, diagnostic and system management information comprising:
a fault notification management device including a fault notification management interface configured for:
receiving a selection of a light-emitting diode (LED)-based directed servicing mechanism, and
receiving a network fault status request input;
a network fault status indicator including one or more LEDs, the LEDs configured for illumination in a sequence corresponding to a path associated with locating one or more server nodes having one or more faults according to one or more detected server node faults and the selection of the LED-based directed servicing mechanism; and
one or more server nodes, a server node of the one or more server nodes including:
a server node fault status indicator, and
a server node fault controller configured to broadcast one or more server node fault notifications to the fault notification management device.

19. The system of claim 18, wherein the fault notification management device comprises:
a fault notification management device integrated into a server chassis.

20. The system of claim 18, wherein the fault notification management device comprises:
a pluggable fault notification management device.

21. The system of claim 18, wherein the fault notification management device comprises:
a mobile fault notification management device.

22. The system of claim 18, wherein the server node fault status indicator comprises:
a push-button LED server node fault status indicator.

23. The system of claim 18, wherein the network fault status indicator comprises:
a push-button LED network fault status indicator.

* * * * *